(12) United States Patent
Atzmueller et al.

(10) Patent No.: US 7,818,717 B2
(45) Date of Patent: Oct. 19, 2010

(54) METHOD FOR THE REMOTE CONTROL PROGRAMMING OF MACHINE CONTROLLERS AND MACHINE CONTROLLER FOR CARRYING OUT SAID METHOD

(75) Inventors: Clemens Atzmueller, Gemuenden (DE); Werner Mueller, Steinfeld (DE); Thomas Brandl, Lohr am Main (DE); Derick Feldmann, Lohr am Main (DE); Michael Leibold, Kuernach (DE); Wolfgang Hefner, Faulbach (DE); Maik Koehler, Dresden (DE); Frank Dehner, Dresden (DE); Guido Forthofer, Lohr am Main (DE)

(73) Assignee: Rexroth Indramat GmbH, Lohr am Main (DE)

( * ) Notice: Subject to any disclaimer, the term of this patent is extended or adjusted under 35 U.S.C. 154(b) by 1064 days.

(21) Appl. No.: 10/471,154

(22) PCT Filed: Mar. 11, 2002

(86) PCT No.: PCT/DE02/00843

§ 371 (c)(1),
(2), (4) Date: Jan. 2, 2004

(87) PCT Pub. No.: WO02/073326

PCT Pub. Date: Sep. 19, 2002

(65) Prior Publication Data

US 2004/0088279 A1 May 6, 2004

(30) Foreign Application Priority Data

Mar. 9, 2001 (DE) .................................. 101 11 393

(51) Int. Cl.
*G06F 9/44* (2006.01)
*G06F 9/445* (2006.01)
*G05B 11/01* (2006.01)
*G05B 19/18* (2006.01)

(52) U.S. Cl. .................. 717/110; 717/168; 717/174; 700/18; 700/65

(58) Field of Classification Search ................ 717/168, 717/171, 172, 178, 174, 110
See application file for complete search history.

(56) References Cited

U.S. PATENT DOCUMENTS

| 4,347,563 A | * | 8/1982 | Paredes et al. | ................. 700/8 |
| 5,155,847 A | * | 10/1992 | Kirouac et al. | ............. 709/221 |
| 5,287,515 A | * | 2/1994 | Murai | ........................ 717/171 |
| 5,287,548 A | * | 2/1994 | Flood et al. | ................... 700/18 |
| 5,410,469 A | * | 4/1995 | Sakamoto et al. | .............. 700/9 |
| 5,504,902 A | | 4/1996 | McGrath | |

(Continued)

*Primary Examiner*—Tuan Q Dam
*Assistant Examiner*—Marina Lee
(74) *Attorney, Agent, or Firm*—Michael J. Striker

(57) ABSTRACT

The invention relates to a method for remote-control programming and to a machine control system 2 for performing the method. To refine the method so as to simplify and shorten an execution operation of a control program source yet automatically avoid version conflicts between the control program source and the compilate in the machine control system, it is proposed that the program source 3a stored in memory in the machine control system be executed by means of a programming device 1, and after the execution, the compilate of the executed program source is generated and stored in memory in the machine control system, where it is made available to a control module.

11 Claims, 1 Drawing Sheet

U.S. PATENT DOCUMENTS

| | | |
|---|---|---|
| 5,508,909 A | 4/1996 | Maxwell |
| 5,781,776 A | 7/1998 | Rischar et al. |
| 5,805,897 A * | 9/1998 | Glowny ................... 717/178 |
| 5,818,711 A | 10/1998 | Urdaneta et al. |
| 5,859,977 A * | 1/1999 | Nishiyama et al. .......... 709/223 |
| 6,263,497 B1 * | 7/2001 | Maeda et al. ............... 717/170 |
| 6,290,403 B1 * | 9/2001 | Onishi et al. ............... 712/200 |
| 6,457,176 B1 * | 9/2002 | King ......................... 717/173 |
| 6,493,768 B1 * | 12/2002 | Boutcher ................... 719/330 |
| 6,505,084 B2 * | 1/2003 | Blumenstock ............... 700/21 |
| 6,556,127 B1 * | 4/2003 | Moser et al. ................ 340/5.84 |
| 6,611,865 B1 * | 8/2003 | Perugini et al. ............. 709/224 |
| 6,647,315 B1 * | 11/2003 | Sherriff et al. .............. 700/204 |
| 6,675,201 B1 * | 1/2004 | Parkkinen ................... 709/216 |
| 6,735,768 B1 * | 5/2004 | Tanaka ....................... 717/174 |
| 6,865,737 B1 * | 3/2005 | Lucas et al. ................. 717/178 |
| 6,904,424 B1 * | 6/2005 | Gusler et al. .................. 707/1 |
| 6,948,163 B2 * | 9/2005 | Melahn et al. .............. 717/168 |
| 7,350,204 B2 * | 3/2008 | Lambert et al. ............. 717/172 |
| 7,429,910 B2 * | 9/2008 | Domenz et al. ............ 340/5.23 |
| 2003/0226138 A1 * | 12/2003 | Luu ........................... 717/175 |

* cited by examiner

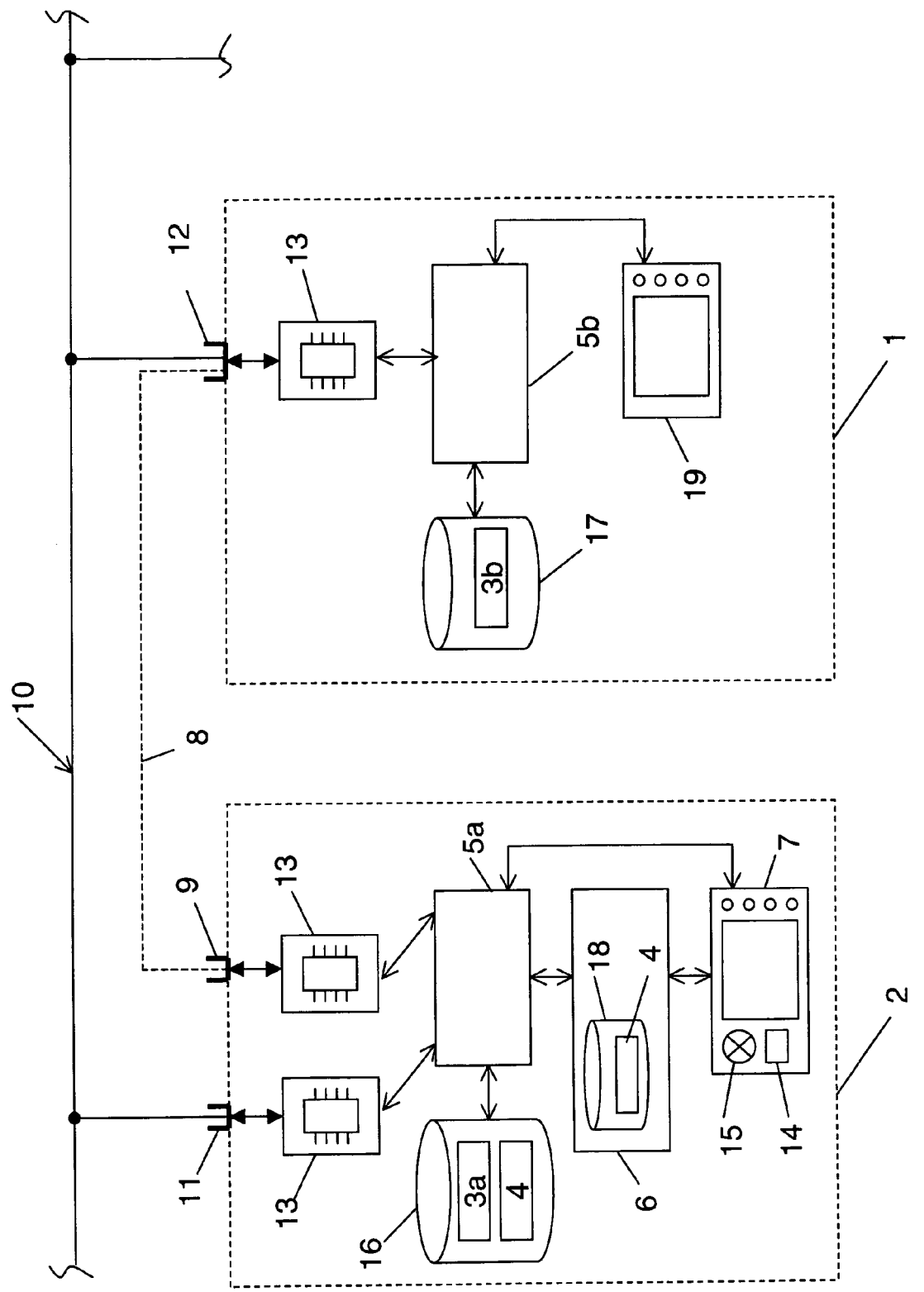

METHOD FOR THE REMOTE CONTROL PROGRAMMING OF MACHINE CONTROLLERS AND MACHINE CONTROLLER FOR CARRYING OUT SAID METHOD

CROSS-REFERENCE TO A RELATED APPLICATION

The invention described and claimed herein below is also described in German Patent Application DE 101 11 393.5 filed on Mar. 9, 2001. This German Patent Application provides the basis for a claim of priority of invention under 35 U.S.C. 119(a)-(d).

BACKGROUND OF THE INVENTION

The invention relates to a method for remote-control programming of machine control systems, and to a PC-based machine control system for performing the method.

An automated production system usually has many machines, each with corresponding machine control systems in which a compiled control program is stored in memory. Upon startup and when changes are made, such as in optimizing production sequences, searching for errors and error correction, and so forth, individual control programs or all the control programs, such as SPS control programs, must often be generated or modified.

Although the capability of executing a control program source is present in each machine control system, the execution is usually performed by a separate programming device provided specifically for that purpose. It can for instance be a PC, and in particular a notebook. This has the advantage that the execution/setup of the control program source can be done centrally on only a single programming device. This can also be done at a completely different place from where the applicable machine or machine control system is located. Another advantage is that both operation of the machine via the operation and visualization module of the machine control system and execution of the control program—in particular, a status display of control signals in debugging the control program—can be done simultaneously with the programming device. To that end, it is known to establish a connection between the programming device and the applicable machine control system, via a serial direct interface between these devices. This is followed by an upload of the control program source from the machine control system into the programming device. The execution is then done via a programming module in the programming device. Next, the executed/set-up control program source is compiled, and the compilate is downloaded into the machine control system. Next, the machine control system is provided with the executed compilate, and the user can disconnect the programming device from the machine control system. At the same time, as a rule there is also a programming module in each machine control system, which always includes the applicable compiler. It is therefore possible to execute the control program, compile it, and load it into a control module of the machine control system directly at the machine control system. Usually, this is the case if the adaptation/modification is relatively slight.

A download of both the control program source and the compilate into the machine control system must always be done. If the download of the control program source into the machine control system is not done, the result is inconsistency of the compilate stored in memory there and the control program source. If a (post-) execution takes place in the in the machine control system, and the newly generated control program source is compiled and downloaded into a control module of the machine control system, then the previously executed compilate may be lost under some circumstances. In the prior art, this is always possible. That is, it is quite possible that (for instance unintentionally), the download of the control program source into the machine control system fails to take place, resulting in the aforementioned inconsistency. In that case, the compilate is newer than the control program source.

SUMMARY OF THE INVENTION

It is the object of the present invention to simplify and shorten an execution operation of a control program source, yet automatically to avoid an unintended loss of the executed control program source, so that the current compilate is always available in the machine control system.

The invention offers the advantage that automatically and without further action, the consistency of data between the control program and the compilate in the machine control system is always assured, and that the current version, namely the version executed with the programming device, of the control program source is always present in the machine control system. The invention furthermore offers substantial simplification and shortening of the execution of a control program source.

These advantages are attained because the program source stored in memory in the machine control system is executed directly in the programming device, and after the execution, the compilate of the executed control program source is generated and stored in memory in the machine control system, where it is made available to a control module.

The programming device can in particular be a commercially available PC, in particular a laptop, which is connected to the machine control system for the sake of maintenance or startup. This will be discussed in further detail hereinafter.

What is essential is that the execution of the control program source takes place in the programming device, without having to be stored in memory there. Instead, for execution by means of the programming device, the control program or the control program source that is stored in memory in the machine control system is used directly. As a result, the program source is executed practically directly at the place where it is stored in memory and is compiled, and thus at the place that is in fact definitive for the proper function and execution of the control program. Inconsistencies between the compilate and the control program source in the machine control system are thus automatically avoided. A critical factor is that the new control program source, that is, the one executed within the context stated above, is always present in the machine control system. Often, the control program source is also modified (usually to a minor extent) in the context of operating the machine with the machine control system. In that case, it is compiled in the machine control system. As a result of the invention, at most the compilate is older than the control program source executed in the context of the invention. However, this inconsistency can always be overcome simply by providing that compilation of the control program source stored in memory be done in the machine control system.

As a result, simple execution, namely execution to be done on a programming device configured specifically for it, is possible for the first time without the risk of data loss or of inconsistencies—as noted above.

According to the invention, compiling the executed program source in the programming device is typically done with an ensuing download of both the program source and the compilate into the machine control system. These are always assured to be in the "latest state".

The invention offers automatic assurance, which is practically impossible to overcome, of the aforementioned consistency in a very simple way. By means of a programming device preconfigured according to the invention and a correspondingly preconfigured machine control system, the aforementioned method is performed quasi-automatically. Operation is practically unchanged externally compared to the prior art; that is, the user need not be aware that the control program source is executed directly in the machine control system.

With the invention, linking of the programming device (such as a PC) to a plurality of machine control systems can also be done simultaneously. This kind of communication connection can for instance be used to compare a plurality of program sources or execute or modify them simultaneously. If a plurality of machine control systems that belong together or cooperate together in the basic machine combination are present, then the execution of the associated program sources can be adapted to one another very simply, without having to connect the programming device sequentially to the various machine control systems and disconnect it again from them.

On the other hand, several work steps can also be eliminated; for instance, the control program source does not have to be downloaded into the machine control system after execution. This is because the correct version of the control program source has automatically been executed and stored in memory in the correct place.

If the program source is to be used for a plurality of machine control systems, or is to be executed, checked or sent onward at some site other than the location of the machine control system, then it must be assured that the program source is additionally stored in memory in the programming device, and that before and/or after the execution, a comparison for a match of the program sources in the machine control system and in the programming device is done. This comparison can be done manually, or automatically. As a result, errors in transmission during the communication are largely precluded. At least, it is always assured that the user (customer service/serving, or the person performing the startup) always has the same version in its programming device that is also running in the machine control system. Then the user—for instance in a central maintenance office or the like—can always perform the work and take care of any problems that arise at the applicable machine control system with a precise match with the control program of the machine control system.

A simultaneous access in other ways during the execution of the program source—which after all is done directly in the machine control system—is reliably prevented because during the communication and/or the execution of the program source, access to the program source of the machine control system is prevented. For that purpose, a flag in the machine control system can be set, for instance, which deactivates the capability of access to the program source of the machine control system. This can be done by hand or automatically. In each case, the flag that has been set prevents simultaneous execution and hence improper access.

The unity and consistency of execution are thus preserved. This is advantageous particularly in large factory buildings, where the user with his programming device is for instance positioned centrally and where he is capable, for instance via a network, of accessing even more-distant machine control systems that he cannot actually see.

For the execution according to the invention, a direct physical communication connection can be provided between the programming device and the machine control system. In that case, the programming device is inserted into a suitable interface of the machine control system and/or vice versa, and the requisite data are transmitted via the interface. In the method of the invention, the execution of the version of the program source stored in memory in the machine control system is after all done with the aid of the programming device. Thus the data transmission is applied over a longer period of time, which as a rule is specifically the length of time the execution process takes. The proposed direct physical communication connection is especially suitable for this purpose, since on the one hand it is a connection that is not very likely to malfunction, and on the other, it does not burden a possibly existing network into which a plurality of machine control systems can be incorporated.

A standardized communication connection, for which the appropriate hardware is usually already in place or can easily be procured, is communication via a direct ethernet interface between the programming device and the machine control system. For instance, if there is a building network of machine control systems, then the programming device can simply be connected to an ethernet interface that for instance is present in the network. However, an additional ethernet interface can also be provided at one machine control system. This will be discussed in further detail hereinafter. Transmission by means of the ethernet protocol is as a rule fast and reliable, so that the method of the invention, with the embodiment proposed, has a low likelihood of error.

Alternatively to this—if the communication is effective via an existing communications network of machine control systems—the programming device can be incorporated into this existing communications network with a corresponding interface and can selectively access an individual machine control system via the communications network. The communications network can for instance be an existing ethernet. For this purpose, however, the internet can also be considered. It is only the selective and arbitrary access of the programming device to an individual machine control system via a network of machine control systems among other elements that is not previously known in the prior art. Such a method, which furthermore functions as in the prior art, that is, with downloading and ensuing uploading, is therefore expressly claimed. This has the advantage that the execution can be done centrally. Long walks are then unnecessary, and the execution proves substantially simpler.

In a network of machine control systems, the machine control system that is to perform the execution is selected in the programming device. Possible mistakes are precluded because the communication and/or the execution are displayed in the machine control system. This can be done for instance via a displayed programming barrier in the machine control system, which is lifted by a confirmation entry. Mistakes in establishing the connection can alternatively be precluded by providing that the machine control system has an additional individual-connection network interface, which is to be connected to a corresponding interface in the programming device, by means of which the communication with the programming device is effected.

To assure that the execution can be done solely by authorized, predetermined persons, it is proposed that the execution of the control program be enabled by an access security, activated in the machine control system, for only predetermined users. Such access security, and the resultant permitted and/or denied access, should be equally effective for the programming device.

It is also proposed that an addressable remote readiness switch is provided in the machine control system and is locked via the access security. This creates further security against unauthorized access. Preferably, the direct operation of the machine control system during the communication and/or during the execution of the program source with the programming device is deactivated. Data access conflicts are thus reliably precluded.

The method of the invention can be performed with a machine control system, without the machine control system, in the case of an existing communications network of machine control systems, having to be disconnected from this network.

BRIEF DESCRIPTION OF THE DRAWINGS

The single FIGURE of the drawings schematically shows a machine controlled system and a programming device for performing a method of the invention.

DESCRIPTION OF THE PREFERRED EMBODIMENTS

The drawing shows a machine control system 2, which is incorporated—for instance jointly with other machine control systems 2— into a communications network 10. The machine control system is incorporated into the communications network 10 (building network) via the left-hand one of the two network adapters 13 shown. To that end, there is a communications network interface 11 in the machine control system 2, and by way of it the applicable connection is made. The machine control system has a memory means 16, which can communicate with a programming module 5a of the machine control system 2. As a result, the data are exchanged between the programming module 5a and the memory means 16 of the machine control system 2. A operation and visualization module 7 is also provided, which on the one hand permits direct operation of the associated machine and on the other allows changes to an existing control program of a program source to be input. At the same time, the change is displayed in the monitor, shown only schematically, of the operation and visualization module 7. Machine states can also be displayed here.

The machine control system 2 communicates temporarily particularly during servicing, maintenance or startup—with a programming device 1. The communication can be made via the communications network 10. In that case, the programming device 1 and the machine control system 2 are connected to the communications network 10 via the communications network interfaces 11 and 12 shown. The connection in that case is not direct but instead is effected for instance via a header of the network protocol, which is sent by the applicable device and addresses the applicable machine control system 2.

The alternative variant in which the programming device 1 communicates with the machine control system 2 via a direct physical communication connection 8 is shown in dashed lines. Then the communication is established via the communications network interfaces—in the case illustrated, direct ethernet interfaces 9, 12. It is also possible for both communication possibilities to be employed simultaneously. In that case, the program source can be executed both in the directly connected machine control system 2 and simultaneously in other machine control systems 2 of the communications network 10—for instance synchronously.

In the programming device 1, there is a programming module 5b, which is in interaction with the user via an input and visualization module 19. A corresponding programming module 5a is also present in the machine control system 2. The program source 3a is stored in memory in the machine control system 2. At the same time, it can also (3b) be stored in memory in the programming device 1, for instance in order to use the program source for other machine control systems, or to test it or make it available at a different location.

Via the communication connection between the programming device 1 and the machine control system 2, the execution of the program source is effected directly in the machine control system 2; that is, by means of the programming device 1, the program source in the machine control system 2 is changed or executed. The programming device 1 is a quasi-remote I/O peripheral of the machine control system 2, but a programming module 5b must also be present in the programming device 1.

The programming module 5b of the programming device 1 communicates—likewise bidirectionally—with a memory means 17 of the programming device 1. The program source can be stored in this memory means as well.

The data shown are represented merely symbolically by cylindrical portions of the respective memory means 16, 17, 18 and are identified here by the data concealed behind them, that is, program sources and compilate. The method according to the invention functions as follows:

The programming device 1 is put into a communication connection with the programming device 2 via the direct communication connection 8 (interfaces 9, 12) or via the communications network 10 (interfaces 11, 12). This can be done for instance by addressing via the communications network 10. Once the communication connection is established, optionally either the program source 3a from the machine control system 2 is uploaded into the programming device 1 (if a program source 3a is initially present at all), or the program source 3b is initially compared with the program source 3a in the machine control system 2. Next, via the communication connection, the execution is done in the programming module 5b of the programming device 1, specifically with execution/modification of the program source 3a in the machine control system 2. Thus via the communication interface, the programming module 5b accesses the program source 3a in the programming module 5a of the machine control system 2 in the execution process. As needed, the requisite read-write accesses to the program source 3a take place in a memory means 16, 18 or in a working memory (not shown) of the machine control system 2. The execution is displaced in the operation and visualization module 7 of the machine control system 2 by means of the communication/execution display 15. Provision can also be made so that before the onset of execution, a remote readiness switch 14 in the machine control system, that can be spoken to, must be actuated, to preclude mistakes among different machine control systems.

Once the program source 3a has been generated/executed/modified in the machine control system 2, a further upload of the program source 3a into the programming device 1 and/or a comparison of the program sources 3a, 3b can—again optionally—be done. After that, the programming device 1 is disconnected from the machine control system 2, or—if the communication is provided via the communications network 10— the communication connection between the programming device 1 and the machine control system 2 is broken, and/or the programming device 1 is logged off from the machine control system 2, for instance. After that, the programming device 1 can then selectively and arbitrarily access another machine control system 2.

The compilate of the executed program source is either generated in the programming module 5b, which also includes a compiler, and then downloaded, or it is generated in the machine control system 2 from the executed control program source and loaded into a control module 6, where it is stored in a memory means 18, provided for the purpose, of the control module 6. The control module 6 can be a software module of the machine control system 2. However, dedicated control hardware that forms the control module 6 can be provided instead. In each case, the compile must be stored in memory in the control module 6, for instance in the memory means 18 of the control module 6. However, it can also be stored in particular in the memory means 16 of the machine control system 2. The memory means 16, 18 can be a physical memory (hard disk, RAM or working memory) of the machine control system 2.

List of Reference Numerals

1 Programming device
2 Machine control system
3a Program source in the machine control system
3b Program source in the programming device
4 Compile
5a Programming module in the machine control system
5b Programming module in the programming device
6 Control module
7 Operation and visualization module
8 Direct communication connection
9 Direct ethernet interface
10 Communications network
11 Communications network interface
12 Communications network interface of the programming device
13 Network adapter
14 Remote readiness switch
15 Communication/execution display
16 Memory means of the machine control system
17 Memory means of the programming device
18 Memory means of the control module
19 Input and display module

The invention claimed is:

1. A method of remote-control programming of a remote machine control system (2), wherein a programming device (1) communicates temporarily, in particular during maintenance or upon startup, with the remote machine control system (2), and an execution of a control program, whose program source (3a) and whose compile (4) are stored in memory in the remote machine control system (2), takes place directly by means of the programming device (1) using the program source (3a) stored in the memory of the remote machine control system (2) and the programming device (1) includes a programming module (5b) by means of which the program source (3a) stored in memory in the remote machine control system (2) is executed by the programming device (1), and after the execution, the compile (4) of the executed program source (3a) is generated and stored in the memory in the remote machine control system (2) and the compile (4) is furnished to a control module (6) in the remote machine control system (2), wherein the communication and/or the execution is displayed at the remote machine control system (2) to avoid possible mistakes via a communication/execution display (15) of an operation and visualization module (7) in the remote machine control system and a programming barrier is displayed in the remote machine control system (2), which prevents the execution, but which is lifted by means of a confirmation entry so that the execution takes place.

2. The method of claim 1, wherein the program source (3a) is additionally stored in memory in the programming device (1) as program source (3b) and wherein before and/or after the execution of the program source (3a) by the programming device (1) directly using the program source (3a) stored in the memory of the remote machine control system (2), a comparison of the program source (3a) stored in the remote machine control system and the program source (3b) stored in the programming device (1) is performed so that errors during transmission are precluded.

3. The method of claim 1, wherein during the communication and/or during the execution of the program source (3a) by the programming device (1) directly using the program source (3a) stored in the memory of the remote machine control system (2), access to the program source (3a) of the remote machine control system (2) is prevented.

4. The method of claim 1, wherein the communication is effected via an existing communications network (10) of remote machine control systems (2), into which network the programming device (1) is incorporated, and the programming device (1) selectively accesses an individual remote machine control system via the communications network (10).

5. The method of claim 1, wherein the execution of the control program is enabled by an access security, activated in the remote machine control system, for only predetermined users.

6. The method of claim 5, wherein an enabled access to the remote machine control system (2) and/or a denied access to the programming device (1) is equally effective.

7. A method of remote-control programming of a remote machine control system (2), wherein a programming device (1) communicates temporarily, in particular during maintenance or upon startup, with the remote machine control system (2), and an execution of a control program, whose program source (3a) and whose compile (4) are stored in memory in the remote machine control system (2), takes place directly by means of the programming device (1) using the program source (3a) stored in the memory of the remote machine control system (2) and the programming device (1) includes a programming module (5b) by means of which the program source (3a) stored in memory in the remote machine control system (2) is executed by the programming device (1), and after the execution, the compile (4) of the executed program source (3a) is generated and stored in the memory in the remote machine control system (2) and the compile (4) is furnished to a control module (6) in the remote machine control system (2), wherein the communication and/or the execution is displayed at the remote machine control system (2) to avoid possible mistakes via a communication/execution display (15) of an operation and visualization module (7) provided in the remote machine control system (2) and a programming barrier is displayed in the remote machine control system (2), which prevents the execution but which is lifted so that the execution takes place by means of a confirmation entry, and wherein during the communication and/or during the execution of the program source (3a), access to the program source (3a) of the remote machine control system (2) is controlled by setting a flag of the remote machine control system (2), which prevents access to the program source (3a) of the remote machine control system (2).

8. The method of claim 1, wherein the programming device (1) communicates temporarily, in particular during the maintenance or the startup, with the remote machine control system (2) via a direct physical communication connection (8) between the programming device (1) and the remote machine control system (2).

9. The method of claim 8, wherein the communication connection (8) is made via a direct Ethernet interface (9) between the programming device (1) and the remote machine control system (2).

10. A remote machine control system, in particular for performing the method of claim 9, wherein the remote machine control system is incorporated, via a communications network interface (11), into a communications network (10) of remote machine control systems (2) and has an additional individual-connection network interface (9), which is to be connected to a corresponding interface (12) of the programming device (1), as a result of which the communication with the programming device (1) takes place.

11. A method of remote-control programming of a remote machine control system (2), wherein a programming device (1) communicates temporarily, in particular during maintenance or upon startup, with the remote machine control system (2), and an execution of a control program takes place, whose program source (3a) and whose compilate (4) are stored in memory in the remote machine control system (2), takes place directly by means of the programming device (1) using the program source (3a) stored in the memory of the remote machine control system (2) and the programming device (1) includes a programming module (5b) by means of which the program source (3a) stored in memory in the remote machine control system (2) is executed by the programming device (1), and after the execution, the compilate (4) of the executed program source (3a) is generated and stored in the memory in the remote machine control system (2) and the compilate (4) is furnished to a control module (6) in the remote machine control system (2), wherein the communication and/or the execution is displayed at the remote machine control (2) system to avoid possible mistakes via a communication/execution display (15) of an operation and visualization module (7) provided in the remote machine control system (2) and a programming barrier is displayed in the remote machine control system (2), which prevents the execution but which is lifted so that the execution takes place by means of a confirmation entry, wherein the execution of the control program is enabled by an access security, activated in the remote machine control system (2), for only predetermined users, wherein an enabled access to the remote machine control system (2) and/or a denied access to the programming device (1) is equally effective, and wherein an addressable remote readiness switch (14) that can be spoken to is provided in the remote machine control system (2) and is locked via the access security.

* * * * *